United States Patent
Taubman et al.

(10) Patent No.: US 10,205,951 B2
(45) Date of Patent: Feb. 12, 2019

(54) METHOD OF SIGNALLING MOTION INFORMATION FOR EFFICIENT SCALABLE VIDEO COMPRESSION

(75) Inventors: David Taubman, Sydney (AU); Andrew Secker, Sydney (AU)

(73) Assignee: Unisearch Limited, Sydney (AU)

(*) Notice: Subject to any disclaimer, the term of this patent is extended or adjusted under 35 U.S.C. 154(b) by 988 days.

(21) Appl. No.: 13/421,788

(22) Filed: Mar. 15, 2012

(65) Prior Publication Data
US 2012/0230414 A1 Sep. 13, 2012
US 2017/0163993 A9 Jun. 8, 2017

Related U.S. Application Data

(63) Continuation of application No. 10/528,965, filed as application No. PCT/AU03/01233 on Sep. 19, 2003, now abandoned.

(30) Foreign Application Priority Data

Sep. 20, 2002 (AU) .................... 2002951574

(51) Int. Cl.
*H04N 7/12* (2006.01)
*H04N 11/02* (2006.01)
(Continued)

(52) U.S. Cl.
CPC ......... *H04N 19/184* (2014.11); *H04N 19/122* (2014.11); *H04N 19/147* (2014.11);
(Continued)

(58) Field of Classification Search
CPC .... H04N 19/122; H04N 19/147; H04N 19/19; H04N 19/31; H04N 19/46; H04N 19/52; H04N 19/54; H04N 19/62; H04N 19/635
(Continued)

(56) References Cited

U.S. PATENT DOCUMENTS 5,684,538 A * 11/1997 Nakaya .............. H04N 19/61
    348/699
6,057,892 A * 5/2000 Borer .................. H04N 5/145
    348/699
(Continued)

FOREIGN PATENT DOCUMENTS

WO  9838800   9/1998
WO  0064185   10/2000

OTHER PUBLICATIONS

David Taubman, "High Performance Scalable Image Compression with EBCOT", Jul. 2000; IEEE Transaction on Image Processing, vol. 9 No. 7, Jul. 2000.*
(Continued)

*Primary Examiner* — Jessica M Prince
(74) *Attorney, Agent, or Firm* — Young Basile Hanlon & MacFarlane, P.C.

(57) ABSTRACT

Embodiments of a method for incrementally coding and signaling motion information for a video compression system involving a motion adaptive transform and embedded coding of transformed video samples using a computer are disclosed herein. In one such embodiment, the method includes (a) storing computer-readable instructions in the computer which, when executed, produce an embedded motion field bit-stream, representing each, motion field in coarse to fine fashion and (b) storing computer-readable instructions in the computer which, when executed, interleave contributions from said embedded motion field bit-stream with successive contributions from said embedded coding of the transformed video samples.

28 Claims, 5 Drawing Sheets

(51) Int. Cl.

| | |
|---|---|
| *H04N 11/04* | (2006.01) |
| *H04N 19/184* | (2014.01) |
| *H04N 19/52* | (2014.01) |
| *H04N 19/147* | (2014.01) |
| *H04N 19/46* | (2014.01) |
| *H04N 19/122* | (2014.01) |
| *H04N 19/19* | (2014.01) |
| *H04N 19/62* | (2014.01) |
| *H04N 19/635* | (2014.01) |
| *H04N 19/31* | (2014.01) |
| *H04N 19/54* | (2014.01) |

(52) U.S. Cl.
CPC ............ *H04N 19/19* (2014.11); *H04N 19/31* (2014.11); *H04N 19/46* (2014.11); *H04N 19/52* (2014.11); *H04N 19/54* (2014.11); *H04N 19/62* (2014.11); *H04N 19/635* (2014.11)

(58) Field of Classification Search
USPC .................................................. 375/240.08
See application file for complete search history.

(56) References Cited

U.S. PATENT DOCUMENTS

| | | | |
|---|---|---|---|
| 6,392,705 B1 | 5/2002 | Chaddha | |
| 6,845,130 B1 | 1/2005 | Han et al. | |
| 6,961,383 B1* | 11/2005 | Reibman | H04N 19/105 |
| | | | 375/240.02 |
| 2001/0031003 A1* | 10/2001 | Sawhney | H04N 19/63 |
| | | | 375/240.14 |
| 2001/0041015 A1* | 11/2001 | Chui | G06F 17/148 |
| | | | 382/240 |
| 2002/0101929 A1* | 8/2002 | Zheng | H04N 19/63 |
| | | | 375/240.21 |
| 2003/0035478 A1* | 2/2003 | Taubman | G06T 9/00 |
| | | | 375/240.11 |
| 2003/0113027 A1* | 6/2003 | Chan | H04N 19/70 |
| | | | 382/240 |
| 2004/0264576 A1* | 12/2004 | Woods | H04N 19/615 |
| | | | 375/240.24 |

OTHER PUBLICATIONS

J.M. Shapiro, "An Embedded Hierachial Image Coder Using Zerotrees of Wavelet Coefficients," in IEEE Data Compression Conf., Snowbird, UT, 1993 pp. 214-223.*

Sheng, Fang "Lossy and Lossless Image Compression Using Reversible Integer Wavelet Transforms" IEEE Int. Conf. Image Processing Oct. 1998 pp. 876-880.*

J.M. Shapiro, "An embedded Hierachical Image Coder Using Zerotrees of Wavelet Coefficients", IEEE Data Compression Conf. Snowbird, UT 1993, pp. 21-223.*

Taubman, "High Performance Scalable Image Compression with EBCOT" IEEE Transaction on Image Processing vol. 9 No. 7, Jul. 2000, pp. 1158-1170.*

Secker, Andrew, and Taubman, David; Highly Scalable Video Compression Using a Lifting-Based 3D Wavelet Transform With Deformable Mesh Motion Compensation; Univ. of New South Wales; pp. 1-4.

* cited by examiner

METHOD OF SIGNALLING MOTION INFORMATION FOR EFFICIENT SCALABLE VIDEO COMPRESSION

CROSS-REFERENCE TO RELATED APPLICATIONS

This application is a continuation of U.S. patent application Ser. No. 10/528,965, filed Feb. 13, 2006, which was the National Stage of International Application No. PCT/AU03/01233, filed Sep. 19, 2003 and claims priority to Australian Patent Application No. 2002951574, filed Sep. 20, 2002, all of which are hereby incorporated by reference in their entireties.

TECHNICAL FIELD

The present invention relates to efficient compression of motion video sequences and, in preferred embodiments, to a method for producing a fully scalable compressed representation of the original video sequence while exploiting motion and other patio-temporal redundancies in the source material. The invention relates specifically to the representation and signalling of motion information within a scalable compression framework which employs motion adaptive wavelet lifting steps. Additionally, the present invention relates to the estimation of motion parameters for scalable video compression and to the successive refinement of motion information by temporal resolution, spatial resolution or precision of the parameters.

BACKGROUND

For the purpose of the present discussion, the term "internet" will be used both in its familiar sense and also in its generic sense to identify a network connection over any electronic communications medium or collection of cooperating communications systems.

Currently, most video content which is available over the internet must be pre-loaded in a process which can take many minutes over typical modem connections, after which the video quality and duration can still be quite disappointing. In some contexts video streaming is possible, where the video is decompressed and rendered in real-time as it is being received; however, this is limited to compressed bit-rates which are lower than the capacity of the relevant network connections. The most obvious way of addressing these problems would be to compress and store the video content at a variety of different bit-rates, so that individual clients could choose to browse the material at the bit-rate and attendant quality most appropriate to their needs and patience. Approaches of this type, however, do not represent effective solutions to the video browsing problem. To see this, suppose that the video is compressed at bit-rates of R, 2R, 3R, 4R and 5R. Then storage must be found on the video server for all these separate compressed bit-streams, which is clearly wasteful. More importantly, if the quality associated with a low bit-rate version of the video is found to be insufficient, a complete new version must be downloaded at a higher bit-rate; this new bit-stream must, take longer to download, which generally rules out any possibility of video streaming.

To enable real solutions to the remote video browsing problem, scalable compression techniques are essential. Scalable compression refers to the generation of a bit-stream which contains embedded subsets, each of which represents an efficient compression of the original video with successively higher quality. Returning to the simple example above, a scalable compressed video bit-stream might contain embedded sub-sets with the bit-rates of R, 2R, 3R, 4R and 5R, with comparable quality to non-scalable bit-streams, having the same bit-rates. Because these subsets are all embedded within one another, however, the storage required on the video server is identical to that of the highest available bit-rate. More importantly, if the quality associated with a low bit-rate version of the video is found to be insufficient, only the incremental contribution required to achieve the next higher level of quality must be retrieved from the server. In a particular application, a version at rate R might be streamed directly to the client in real-time; if the quality is insufficient, the next rate-R increment could be streamed to the client and added to the previous, cached bit-stream to recover a higher quality rendition in real time. This process could continue indefinitely without sacrificing the ability to display the incrementally improving video content in realtime as it is being received from the server.

The above application could be extended in a number of exciting ways. Firstly, if the scalable bit-stream also contains distinct subsets corresponding to different intervals in time, then a client could interactively choose to refine the quality associated with specific time segments which are of the greatest interest. Secondly, if the scalable bit-stream also contains distinct subsets corresponding to different spatial regions, then clients could interactively choose to refine the quality associated with specific spatial regions over specific periods of time, according to their level of interest. In a training video, for example, a remote client could interactively "revisit" certain segments of the video and continue to stream higher quality information for these segments from the server, without incurring any delay.

To satisfy the needs of applications such as that mentioned above, low bit-rate subsets of the video must be visually intelligible. In practice, this means that most of the available bits will be devoted to a low bit-rate portion of the video are likely to contribute to the reconstruction of the video at a reduced frame rate, since attempting to recover the full frame rate video over a low bit-rate channel will result in unacceptable deterioration of the spatial details within each frame. In order to achieve smooth quality scalability within a compressed video sequence which also offers frame rate scalability, the details required to recover higher frame rates must contribute to the refinement of a model which involves motion sensitive temporal interpolation.

Without temporal interpolation, missing frames cannot be introduced into a low rate video sequence without first augmenting their spatial fidelity to a level commensurate with the frames already available, and this implies a large discontinuous jump in the amount of information which must be provided to the decoder in order to smoothly increase the reconstructed video quality. Continuing this line of argument, we see that motion information is important to highly scalable video compression; moreover, the motion itself, must be represented in a manner which can be scaled, according to the temporal resolution (frame rate), spatial resolution and quality of the sample data.

Motion Adaptive Transforms Based on Wavelet Lifting

The present invention is best appreciated in the context of an earlier invention, which is the subject of WO02/50772. This earlier patent application describes a method for modifying the individual lifting steps in a lifting implementation of a temporal wavelet decomposition, so as to compensate for the effects of motion. This method has the following advantageous properties: 1) the motion sensitive transform may be perfectly inverted, in the absence of any compression artefacts; 2) the low temporal resolution subsets of the wavelet hierarchy offer high spatial fidelity so that the transform allows excellent frame rate scalability; 3) the high pass temporal detail subbands produced by the transform have very low energy, allowing high compression efficiency; 4) in the absence of motion, the transform reduces to a regular wavelet decomposition along the temporal axis; and 5) in the presence of locally translational motion, the transform is equivalent to applying a regular wavelet decomposition along the motion trajectories.

To assist in the present discussion, we briefly summarise the key ideas behind this earlier invention. Any two-channel FIR subband transform can be described as a finite sequence of lifting steps [W. Sweldens, "The lifting scheme: A custom-design construction of biorthogonal wavelets," Applied and Computational Harmonic Analysis, vol 3, pp 196-2000, April 1996]. It is instructive to begin with an example based upon the Haar wavelet transform. Up to a scale factor, this transform may be realised in the temporal domain, through a sequence of two lifting steps, as $$h_k[n] = x_{2k+1} - x_{2k}[n]$$

$$l_k[n] = x_{2k} + \frac{1}{2} h_{2k}[n]$$

where $x_k[n] \propto x_k[n_1, n_2]$ denotes the samples of frame k from the original video sequence and $h_k[n] \propto h_k[n_1, n_2]$ and $l_k[n] \propto l_k[n_1, n_2]$ denote the high-pass and low-pass subband frames.

$l_k[n]$ and $h_k[n]$ correspond to the scaled sum and the difference of each original pair of flames. An example is shown in FIG. 1A. Since-motion is ignored, ghosting artefacts are clearly visible in the low-pass temporal subband, and the high-pass subband, frame has substantial energy.

Now let $W_{k1 \to k2}$ denote a motion-compensated mapping of frame k1 onto the coordinate system of frame k2, so that $W_{k1 \to k2}(x_{k1}[n]) \approx x_{k2}[n])$ for all n. The lifting steps are modified as follows.

$$h_k[n] = x_{2k+1[n]} - W_{2k \to 2k+1(x_{2k})[n]} \quad (1)$$

$$l_k[n] = x_{2k}[n] + \frac{1}{2} W_{2k+1 \to 2k(h_k[n])} \quad (2)$$

Note that $W_{2k \to 2k+1}$ and $W_{2k+1 \to 2k}$ represent forward and backward motion mappings, respectively. The high-pass subband frames correspond to motion-compensated residuals. These will be close to zero in regions where the motion is accurately modelled. The result is shown in FIG. 1B.

The framework described above is readily extended to any two-channel FIR subband transform, by motion-compensating the relevant lifting steps.

We demonstrate this in the important case of the biorthogonal 5/3 wavelet transform [D. Le Gall and A. Tabatabai, "Sub-band coding of digital images using symmetric short kernal filters and arithmetic coding techniques," IEEE International Conference on Acoustics, Speech and Signal Processing, vol. 2, pp 761-764, April 1988]. As before, $x_{2k}[n]$ and $x_{2k+1}[n]$ denote the even and odd indexed frames from the original sequence. Without motion, the 5/3 transform may be implemented by alternatively updating each of these two frame subsequences, based on filtered versions of the other sub-sequence. The lifting steps are $$h_k[n] = x_{2k+1}[n] - \frac{1}{2}(x_{2k}[n] - x_{2k+2}[n])$$

$$l_k[n] = x_{2k}[n] + \frac{1}{4}(h_{k-1}[n])$$

As before, we introduce motion warping operators within each lifting step, which yields the following $$h_k[n] = x_{2k+1}[n] - \frac{1}{2}(W_{2k \to 2k+1}(x_{2k})[n] + W_{2k+2 \to 2k+1}(x_{2k+2})[n]) \quad (3)$$

$$l_k[n] = x_{2k}[n] + \frac{1}{4}(W_{2k-1 \to 2k}(h_{k-1})[n] + W_{2k+1 \to 2k}(h_k)[n]) \quad (4)$$

FIG. 2 demonstrates the effect of these modified lifting steps. The highpass frames are now essentially the residual from a bidirectional motion compensated prediction of the odd-indexed original frames. When the motion is adequately captured, these high-pass frames have little energy and the low-pass frames have excellent spatial fidelity.

Counting the Cost of Motion

In the example of the Haar transform, given above, two separate motion mapping operators, $W_{2k \to 2k+1}$ and $W_{2k+1 \to 2k}$, are required to process every pair of frames, $x_{2k}[n]$ and $x_{2k+1}[n]$. Their respective motion parameters must be transmitted to the decoder. To provide a larger number of temporal resolution levels, the transform is re-applied to the low-pass subband frames, lk[n], for which motion mapping operators $W_{4k \to 4k+2}$ and $W_{4k+2 \to 4k}$ are required for every four frames. Continuing in this way, an arbitrarily large number of temporal resolutions may be obtained, using $$\frac{2}{2} + \frac{2}{4} + \frac{2}{8} + \ldots .2$$

motion fields per original frame.

For the example of the 5/3 transform, also given above, four motion mapping operators, $W_{2k \to 2k+1}$, $W_{2k \to 2k-1}$, $W_{2k+1 \to 2k}$ and $W_{2k-1 \to 2k}$ are required for every pair of frames (indexed by k), for just one level of temporal decomposition. Continuing the transformation to an arbitrarily large number of temporal resolutions involves approximately 4 motion fields per original video frame.

The cost of estimating, coding and transmitting the above motion fields can be substantial. Moreover, this cost may adversely affect the scalability of the entire compression scheme, since it is not immediately clear how to progressively refine the motion fields without destroying the subjective properties of the reconstructed video when the motion is represented with reduced accuracy.

The previous invention clearly reveals the fact that any number of motion modelling techniques are compatible with the motion adaptive lifting transform, and also recommends the use of continuously deformable motion models such as those associated with, triangular or quadrilateral meshes (see, for example, Y. Nakaya and H. Harashima, "Motion compensation based on spatial transformations," IEE Trans. Circ. Syst. For Video Tech., Vol. 4, pp 339-367, June 1994). However, no particular solution is presented to the difficulties described above.

SUMMARY

Accordingly, in one aspect, the present invention provides a method for incrementally coding and signalling motion information for a video compression system involving a motion adaptive transform and embedded coding of transformed video samples, said method comprising the steps of: (a) producing an embedded bit-stream, representing each motion field in coarse to fine fashion; and (b) interleaving incremental contributions from said embedded motion fields with incremental contributions from said transformed video samples.

The present invention also provides a system for incrementally coding and signalling motion information for a video compression system involving a motion adaptive transform and embedded coding of transformed video samples, said system comprising: (a) means for producing an embedded bit-stream, representing each motion field in coarse to fine fashion; and (b) means for interleaving incremental contributions from said embedded motion fields with incremental contributions from said transformed video samples.

Thus, because each motion field is represented in coarse to fine fashion and interleaved with the video data bit-stream, the accuracy required for motion representation can be balanced with the accuracy of the transformed sample values which may be recovered from the bit-stream. Therefore, a fully scalable video bit-stream may be progressively refined, both in regard to its quantised sample representations and in regard to its motion representation.

Preferably, the embedded motion field bit-stream is obtained by applying embedded quantization and coding techniques to the motion field parameter values.

Preferably, the embedded motion field bit-stream is obtained by coding the node displacement parameters associated with a triangular mesh motion model on a coarse to fine grid, each successive segment of the embedded bit-stream providing displacement parameters for node positions which lie on a finer grid than the previous stage, all coarser grids of node positions being subsets of all finer grids of node points.

Preferably, a coarse to fine motion representation is obtained by first transforming the motion parameters and then coding the transform coefficients using embedded quantization and coding techniques.

Preferably, the motion parameters are transformed by applying spatial discrete wavelet transforms and/or temporal transforms thereto.

Preferably, the spatial and/or temporal transforms are reversible integer-to-integer transforms, suitable for lossless compression.

Preferably, the embedded motion bit-streams are arranged into a sequence of quality layers, and the transformed video samples are also encoded into embedded bit-streams which are arranged into a separate sequence of quality layers.

Preferably, said interleaving of the contributions from the embedded motion bit-streams and from the transformed video samples is performed in a manner which minimizes the expected distortion in the reconstructed video sequence at each of a plurality of compressed video bit-rates.

Preferably, the measure of distortion is Mean Squared Error. Preferably, the measure of distortion is a weighted sum of the Mean Squared Error contributions from different spatial frequency bands, weighted according to perceptual relevance factors.

Preferably, the distortion associated with inaccurate representation of the motion parameters is determined using an estimate of the spatial power spectrum of the video source.

Preferably, the distortion associated with inaccurate representation of the motion parameters is determined using information about the spatial resolution at which the video bit-stream is to be decompressed.

Preferably, the power spectrum of the video source is estimated using spatio-temporal video sample subbands created during compression.

Preferably, the proportions of contributions from said embedded motion fields and said transformed video samples in the embedded bit-stream is determined on the basis of a plurality of tables associated with each frame, each table being associated with a spatial resolution at which the video bit-stream is to be decompressed. In the embodiment wherein the embedded motion bit-streams and the transformed video, samples are each encoded as a series of quality layers, the tables identify the number of motion quality layers which are to be included with each number of video sample quality layers.

The preferred structure of the motion representation allows rate-distortion optimal algorithms to balance the contributions of motion information and sample accuracy, as it is being included into an incrementally improving (or layered) compressed representation. While rate-distortion optimisation strategies for balancing motion and sample accuracy have been described in the literature, those algorithms were applicable only to static optimisation of a compressed bit-stream for a single target bit-rate. The preferred embodiment of the present invention allows for the rate-distortion optimised balancing of motion and sample accuracy to be extended to scalable content in which the target bit-rate cannot be known a priori.

According to a further aspect of the present invention, a method for estimating and signalling motion information for a motion adaptive transform based on temporal lifting steps, comprises the steps of (a) estimating and signalling motion parameters describing a first mapping from a source frame onto a target frame within one of the lifting steps; and (b) inferring a second mapping between either said source frame or said target frame, and another frame, based on the estimated and signalled motion parameters associated with said first mapping.

The present invention also provides a system for estimating and signalling motion information for a motion adaptive transform based on temporal lifting steps, said system comprising: (a) means for estimating and, signalling motion, parameters describing a first mapping from a source frame onto a target frame within one of the lifting steps; and (b) means for inferring a second mapping between either said source frame or said target frame, and another frame, based on the estimated and signalled motion parameters associated with said first mapping.

Accordingly, the number of motion fields which must be signalled to the decompressor can be reduced, as some motion fields can be inferred from others.

For instance, in one embodiment said second mapping is the reciprocal mapping from said target frame to said source frame, for use within another one, of the lifting steps. Preferably, said reciprocal mapping is the inverse of the first mapping.

Thus, the preferred embodiment provides a method for estimating and representing only one of the motion fields in each pair, $W_{2k \to 2k+1}$ and $W_{2k+1 \to 2k}$, or $W_{2k \to 2k-1}$, and $W_{2k-1 \to 2k}$. Such pairs of motion fields will be known here as "reciprocal pairs." This allows the total amount of motion information to be reduced to one motion field per frame for the Haar case, and 2 motion fields per frame for the 5/3 case. It is found that collapsing reciprocal pairs to a single motion field, from which the pair is recovered, actually improves the properties of the motion adaptive transform, resulting in increased compression efficiency, even when the benefits of reduced motion cost are not taken into account.

In one embodiment, the motion parameters of said first mapping correspond to deformable triangular mesh motion model. Preferably, said reciprocal mapping is inferred by inverting the affine transformations associated with the triangular mesh used to represent said first mapping.

In another embodiment, the motion parameters of said first mapping correspond to a block displacement motion model.

Preferably, said motion adaptive transform involves multiple stages of temporal decomposition, corresponding to different temporal frame rates.

Preferably, motion parameters at each temporal resolution are deduced from original video frames.

In one embodiment said second mapping is a mapping between frames at a lower temporal resolution than said first mapping, and said second mapping is inferred by compositing the first mapping with at least one further mapping between frames at the higher temporal resolution.

This embodiment enables all of the required motion fields at lower temporal resolutions (higher temporal displacements) to be derived from an initial set of frame-to-frame motion fields. Thus, the compressor need only estimate the motion between each successive pair of frames, $x_k[n]$ and $x_{k+1}[n]$. This substantially reduces the cost in memory and computation of the motion estimation task, without significantly altering the compression efficiency or other properties of the motion adaptive transform.

In another embodiment, said second mapping is a mapping between frames at a higher temporal resolution than said first mapping, and said second mapping is inferred by compositing the first mapping with at least one further mapping at the higher temporal resolution. For example, preferably the higher resolution is double said lower resolution, and alternate mappings at the higher temporal resolution are explicitly signalled to a decompressor, the remaining mappings at the higher temporal resolution being replaced by the mappings inferred by compositing the lower resolution mappings with respective higher resolution mappings. Preferably said replaced mappings are used within the lifting steps of said motion adaptive transform, in place of the originally estimated mappings which were replaced.

This further reduces the motion information to 1 motion field per video frame, even for the 5/3 transform. The method of this embodiment has the property that the motion representation is temporally scalable. In particular, only one motion field must barnacle available to the decoder for each video frame which it can reconstruct, at any selected temporal resolution. This method involves judicious compositing of the forward and backward motion fields from different temporal resolution levels and is compatible with the efficient motion estimation method described above, of compositing motion fields at higher resolutions to obtain motion fields at lower resolutions.

Preferably said replaced mappings are refined with additional motion parameters, said refinement parameters being signalled for use in decompression, and said replaced and refined mappings being used within the lifting steps of said motion adaptive transform, in place of the originally estimated mappings which were replaced.

Preferably, inversion or composition of motion transformations is accomplished by applying said motion transformations to the node positions of a triangular mesh motion model, the composited or inverted motion transformation being subsequently applied by performing the affine transformations associated with said mesh motion model.

Preferably, the source frame is partitioned into a regular mesh and the inversion or composition operations are applied to each node dale regular mesh to find a corresponding location in the target frame, the composited or inverted motion transformation being subsequently applied by performing the affine transformations associated with said mesh motion model. This is a particularly efficient computational method for performing the various motion field transformations required by other aspects of the invention. These methods are preferably replicated at both the compressor and the decompressor, if the transform is to remain strictly invertible.

BRIEF DESCRIPTION OF THE DRAWINGS

The various features, advantages and other uses of the present apparatus will become more apparent by referring to the following detailed description and drawing in which:

FIG. 1A is Embodiments of the invention will now be described with reference to the accompanying drawings, in which:

FIG. 1A illustrates the lifting steps for the Haar temporal transform;

DETAILED DESCRIPTION

1st Aspect: Reciprocal Motion Fields

Figure 1B:
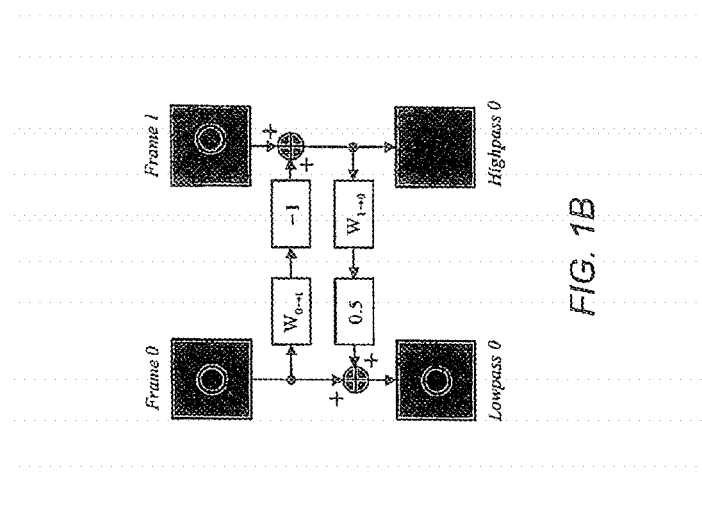
FIG. 1B illustrates a motion adaptive modification of the lifting steps for the Haar temporal transform.
Figure 1A:
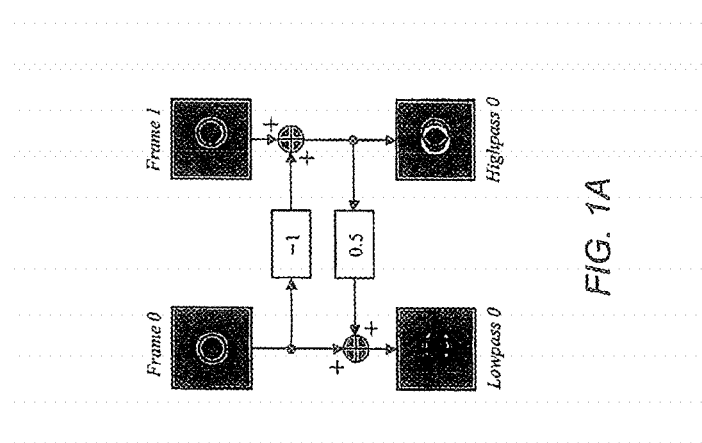
Figure 2:
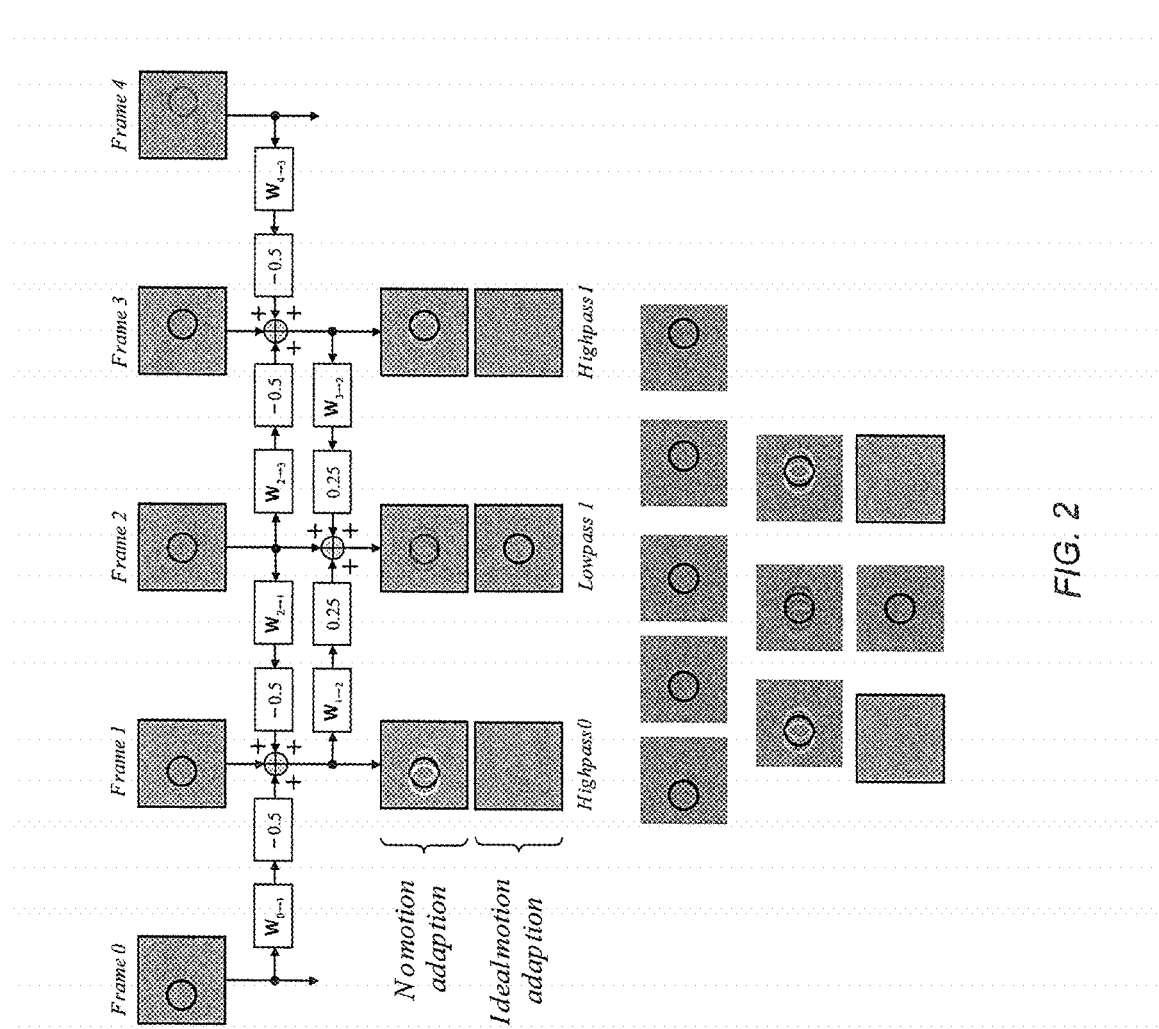
FIG. 2 illustrates the lifting steps for a motion adaptive 5/3 temporal transform.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope into be accorded the broadest interpretation, so as to encompass all such modifications and equivalent structures as is permitted under the law.

A natural strategy for estimating the reciprocal motion fields, $W_{2k \to 2k+1}$ and $W_{2k+1 \to 2k}$, would be to determine the parameters for $W_{2k \to 2k+1}$ which minimise some measure (e.g., energy) of the mapping residual $x_{2k+1} - W_{2k \to 2k+1}(x_{2k})$ and to separately determine the parameters for $W_{2k+1 \to 2k}$ which minimise some measure of its residual signal, $x_{2k} - W_{2k+1 \to 2k}(x_{2k+1})$. In general, such a procedure will lead to parameters for $W_{2k \to 2k+1}$, which cannot be deduced from those for $W_{2k+1 \to k2}$ and vice-versa, so that both sets of parameters must be sent to the decoder.

It turns out that only one of the two motion fields must be directly estimated. The other can then be deduced by "inverting" the motion field which was actually estimated. Both the compressor and the decompressor may perform this inversion so that only one motion field must actually be transmitted.

True scene motion fields cannot generally be inverted, due to the presence of occlusions and uncovered background. One would expect, therefore, to degrade the properties of the motion adaptive transform (e.g., compression performance, or quality of the low temporal resolution frames) by replacing $W_{2k \to 2k+1}$ with an approximate inverse of $W_{2k+1 \to 2k}$ or vice-versa.

It turns out, however, that the opposite is the case. Rather than degrading the transform, representing each reciprocal pair with only one motion field actually improves the compression efficiency and the quality of the low temporal resolution frames.

An explanation for the above phenomenon is given in. A. Seeker and D. Taubman, "Lifting-based invertible motion adaptive transform (LIMAT) framework for highly scalable video compression", accepted to appear in IEEE Trans. Image Proc., 2003, a copy of which is available at www.ee.unsw.edu.an/.about.taubman/. Briefly, the excellent properties of the motion adaptive temporal lifting transform are closely linked to the reciprocal relationship between the pairs, $W_{2k \to 2k+1}$ and $W_{2k+1 \to 2k}$, and $W_{2k \to 2k-1}$ and $W_{2k-1 \to 2k}$. If the frame warping operations described by each pair are truly inverses of one another, the motion adaptive transform is equivalent to a one-dimensional DWT, applied along the underlying motion trajectories. If they are not inverses of one another, this desirable characteristic is lost, no matter how well they are able to minimise motion compensated residuals.

According to the first aspect of the present invention, only one motion field from each reciprocal pair should be directly estimated and communicated to the decompressor. Unless otherwise prohibited (e.g., by the later aspects of the invention), it is mildly preferable to directly estimate and communicate the parameters of the motion field which is used in the first (predictive) lifting step. This is the lifting step described by equations (1) and (3), for the Haar and 5/3 cases, respectively.

Inversion of Triangular Mesh Motion Models

Where the motion is represented by a continuously deformable triangular mesh [Y. Nakaya and H. Harashima, "Motion compensation based on spatial transformations", IEEE Trans. Circ. Syst. For Video Tech., vol. 4, pp 339-367, June 1994], the affine motion which describes the deformation of each triangle in $W_{2k \to 2k+1}$ or $W_{2k \to 2k-1}$ may be directly inverted to recover $W_{2k+1 \to 2k}$ and $W_{2k-1 \to 2k}$, respectively. A triangular-mesh model for motion field $W_{k1 \to k2}$ involves a collection of node positions, $\{ti\}$ in the target frame, $x_{k2}$ together with the locations, $\{si\}$ of those same node positions, as they appear in the source frame, $x_{k1}$. Although scene adaptive meshes have been described, in the preferred embodiment of the invention the target node positions, $\{ti\}$, are fixed, and the motion field is parameterized by the set of node displacements, $\{si-ti\}$. The target frame, $x_{k2}$, is partitioned into a collection of disjoint triangles; whose vertices correspond to the node positions. Since the partition must cover the target frame, some of the target node positions must lie on the boundaries of the frame. An example involving a rectangular grid of target node vertices is shown in FIG. 3.

As suggested by the figure, it is convenient to write $\{\Delta_j\}$ for the set of target frame triangles. Let $t_{j,o}$, $t_{j,1}$ and $t_{j,2}$ denote the vertices of target triangle $\Delta_j$. The triangular mesh then maps the source triangle, $\Delta'_j$, described by the vertices $s_{j,o}$, $s_{j,2}$ and $s_{j,2}$ onto target triangle $\Delta'_j$, The motion map itself is described by an affine transformation. Specifically, for each location, $t \in \Delta_j$, within the target frame, the corresponding location, s, within the source frame is given by the affine equation $$s = A_j t + b_j$$

where t, s and $b_j$ are regarded as column vectors, $A_j$ is a 2×2 matrix; $A_j$ and $b_j$ may be deduced from the motion parameters, using the fact that $t_{j,i}$ must map to $s_{j,i}$ for each i=0, 1, 2. Of course, s does not generally lie on an integer grid, and so the source frame must be interpolated, using any of a number of well-known methods, to recover the value of $(W_{k1 \to k2}(x_{k1}))[t]$.

Figure 3:
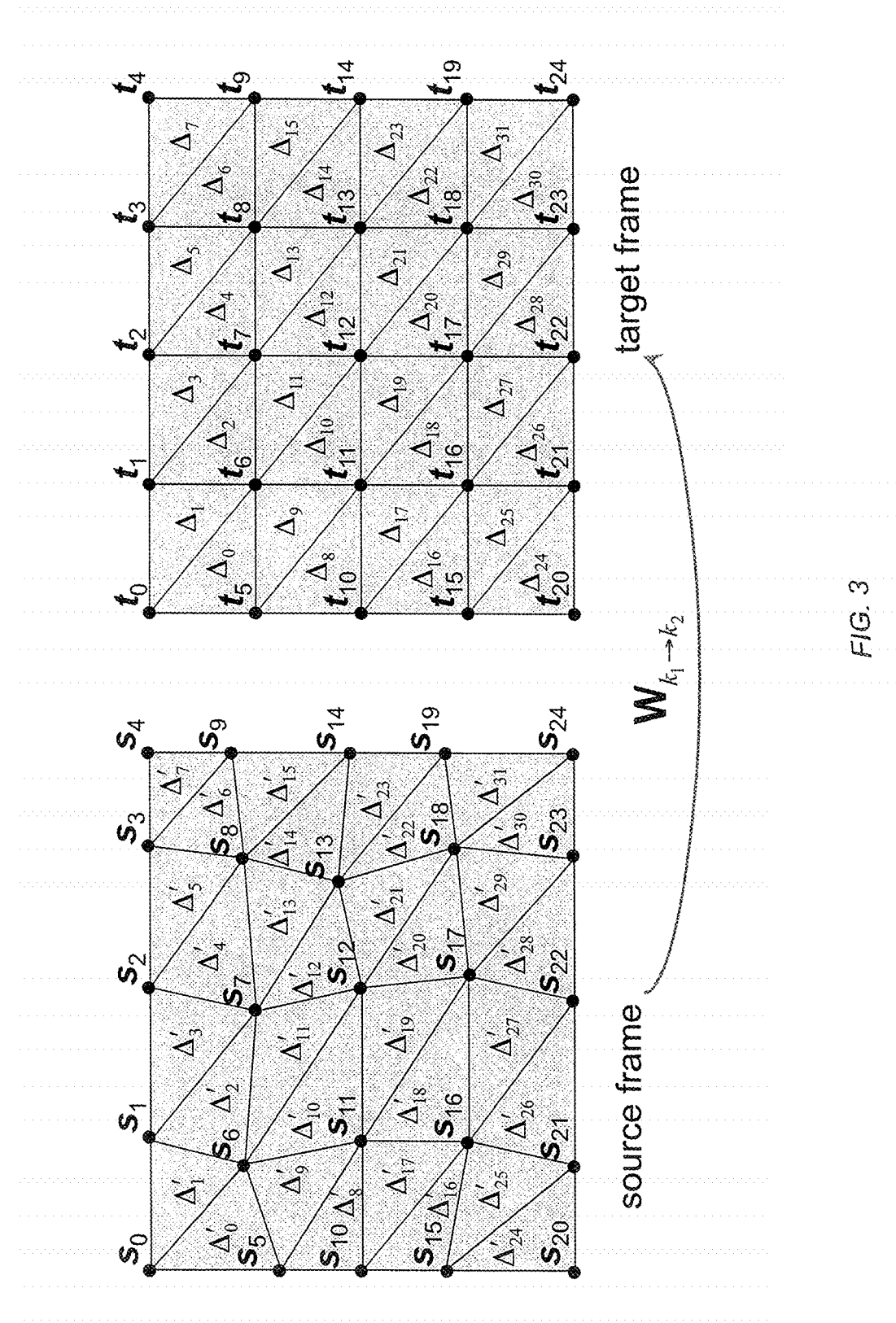
FIG. 3 illustrates a triangular mesh motion model.

In the simplest case, whenever a target node position, $t_i$, lies on the boundary of frame) $x_{k2}$, the corresponding source node position, $s_i$, is constrained to lie on the same boundary of frame $x_{k1}$, as depicted in FIG. 3. In this case, the source triangles, $\Delta'_j$, completely cover the source frame and so each location, s, in frame $x_{k1}$, may be associated with one of the triangles, $\Delta^i_j$ and hence mapped back onto the target frame though the inverse affine relation $$t = A_j^{-1}(s - b_j)$$

In this way, the value of $(W_{k2 \to k1}(x_{k2}))[s]$ may be found for each location, s, by interpolating frame $x_{k2}$ to the location, t.

Constraining boundary nodes, $t_i$, map to nodes, on the same boundary, tends to produce unrealistic motion fields in the neighborhood of the frame boundaries, adversely affecting the ability of the mesh to track true scene motion trajectories. For this reason, the preferred embodiment of the invention does not involve any such constraints. In this case, the source triangles, $\Delta'_j$ will not generally cover frame $x_{k1}$, and inversion of the affine transformations yields values for $(W_{k2 \to k1}(x_{k2}))(s)$ only when s lies within one of the source triangles, $\Delta'_j$. For locations s which do not belong to any of the source triangles, $\Delta'_j$, any of a number of policies may be described. As a simple example, the nearest source triangle, $\Delta'_j$, to s may be found and its affine parameters used to find a location t in frame $x_{k2}$.

An alternative approach is to first extrapolate the mesh to one which is defined over a larger region than that required by the forward motion field $W_{k1 \to k2}$. So long as this region is large enough to cover the source frame, each location s in frame $x_{k1}$ will belong to some source triangle within the extrapolated mesh and the corresponding affine map can be inverted to find the location t in frame $x_{k2}$. In the preferred embodiment of this approach, the node vector $t_e - s_e$ at each extrapolated node position $n_e$ in frame $x_{k2}$, is obtained by linear extrapolation of two node vectors, $t_b - s_b$ and $t_0 - s_0$, having corresponding node positions $n_b$ and $n_0$. Here, the extrapolated node position $n_e$ is outside the boundaries of frame $x_{k2}$, $n_b$ is the location of the nearest boundary node to $n_e$, and $n_0 = 2n_b - n_e$ is the mirror image of n, through the boundary node, $n_b$. The extrapolated node vectors are not explicitly communicated to the decoder, since it extrapolates them from the available interior node positions, following the same procedure as the encoder.

"Inversion" of Block-Displacement Motion Models

Triangular mesh models are particularly suitable for the recovery of a reverse motion field, $W_{k2 \to k1}$, from its forward counterpart $W_{k1 \to k2}$. Most significantly, the transformation between target locations, t, and source locations, s, is continuous over the whole of the target frame. This is a consequence of the fact that the affine transformation maps straight lines to straight lines.

Block displacement models, however, are more popular for video compression due to their relative computational simplicity. A block displacement model consists of a partition of the target frame into blocks, $\{B_i\}$, and a corresponding set of displacements, $\{\delta_i\}$, identifying the locations of each block within the source frame.

Unlike the triangular mesh, block displacement models represent the motion field in a discontinuous (piecewise constant) manner. As a result, they may not properly be inverted. Nevertheless, when reciprocal pairs of motion maps, $W_{k1 \to k2}$ and $W_{k2 \to k1}$, use block displacement models, it is still preferable to estimate and transmit only one of the two motion fields to the decoder, inferring the other through an approximate inverse relationship. Since displacements are usually small, it is often sufficient simply to reverse the sign of the displacement vectors, $\{\delta_i\}$, when forming $W_{k2 \to k1}$ from $W_{k1 \to k2}$ or vice-versa.

2nd Aspect: Compositing of Simple Motion Fields.

For high energy compaction and low temporal resolution frames with high fidelity, it is essential to have accurate motion mappings for each level of a multi-resolution temporal subband decomposition. The transform consists of a sequence of stages, each of which produces a low- and a high-pass temporal subband sequence, from its input sequence. Each stage in the temporal decomposition is applied to the low-pass subband sequence produced by the previous stage.

Since each stage of the temporal decomposition involves the same steps, one might consider applying an identical estimation strategy within each stage, estimating the relevant motion fields from the frame sequence which appears at the input to that stage. The problem with such a strategy is that estimation of the true motion, based on subband frames, may be hampered by the existence of unwanted artefacts such as ghosting. Such artefacts can arise as a result of model failure or poor motion estimation, in previous stages of the decomposition.

To avoid this difficulty, it is preferred to perform motion estimation on the appropriate original frames instead of the input frames to the decomposition stage in question. For example, in the second stage of temporal decomposition it is more effective to estimate the motion mapping $W^{k1 \to k2^{(1)}}$ between subband frames $l_{k1}{}^{(1)}[n]$ and $l_{k2}{}^{(1)}[n]$, by using the corresponding original frames $x_{k1}[n]$ and $x_{k2}[n]$. Similarly, in the third stage, it is more effective to estimate the motion mapping $W_{k1 \to k2}{}^{(2)}$ between subband frames $l_{k1}{}^{(2)}{}_{[n]}$ and $l_{k2}{}^{(2)}{}_{[n]}$, by using the corresponding original frames $x_{4k1}[n]$ and $x_{4k2}[n]$. To clarify the notation being used here, it is noted that the first stage of decomposition employs motion mappings $W_{k1 \to k2}{}^{(0)}$, producing low and high-pass subband frames, $l_k{}^{(1)}[n]$ and $h_k{}^{(1)}[n]$ After several levels of subband decomposition, the temporal displacement over which motion estimation must be performed will, span many original frames. For example, in the fifth level of decomposition the actual temporal displacement between neighbouring subband frames is 16 times the original frame displacement. At a typical frame rate of 30 frames per second (fps), this corresponds to more than half a second of video.

Figure 4:
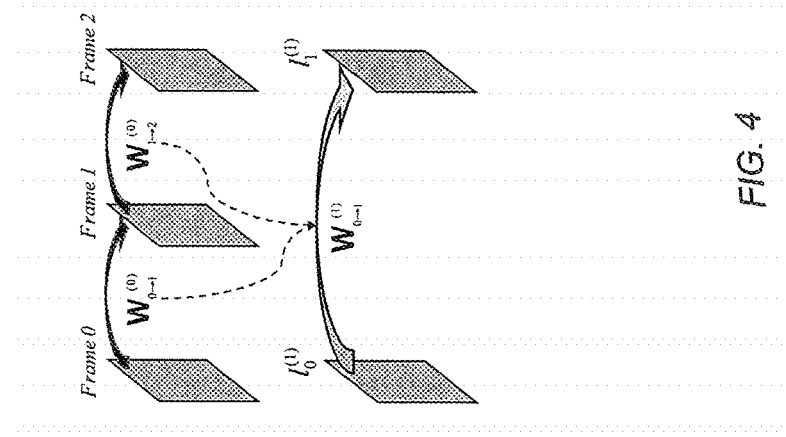
FIG. 4 illustrates schematically the compositing of two motion fields at a higher temporal resolution to create one at a lower resolution.

Motion estimation is generally very difficult over large temporal displacements due to the large possible-range of motion. This complexity can be reduced by using knowledge of motion mappings already obtained in previous levels of the decomposition. For example, as described by equations (3) and (4), the first stage of decomposition with the 5/3 kernel involves estimation of $W_{2k \to 2k+1}{}^{(0)}$ and $W_{2k+2 \to 2k+1}{}^{(0)}$. These may be composited to form an initial approximation for $W_{k \to k+1}{}^{(1)}$, which is required for the second stage of decomposition. This is shown in FIG. 4, where the arrows indicate the direction of the motion mapping. It is often computationally simpler to create composite mappings from source mappings that have the same temporal orientation, as suggested in the figure. If necessary, the source mappings can be inverted to achieve this. However, it is preferable to directly estimate source mappings, having the same direction as the composite mapping.

The initial approximation, formed by motion, field composition in the manner described above, can be refined based on original video data, using motion estimation procedures well known to those skilled in the art. It turns out, however, that the method of compositing motion fields with a frame displacement of 1 to produce motion fields corresponding to larger frame displacements often produces highly accurate motion mappings; that do not need any refinement. In some cases the composit mappings lead to superior motion adaptive transforms than motion mappings formed by direct estimation, or with the aid of refinement steps. The motion field composition method described, here can be repeated throughout the temporal decomposition hierarchy so that all the mappings for the entire transform can be derived from the frame to frame motion fields estimated in the first stage.

The composition method described above eliminates a significant portion of the computational load associated with direct estimation of the required motion fields. A total of one motion mapping must be estimated for each original frame, having a temporal displacement of only one frame. This is sufficient to determine the complete set of motion mappings for the entire transform.

This method is independent of the particular wavelet kernel on which the lifting framework is based; however, the effectiveness of the composition procedure does depend on the selected motion model. An efficient method for performing the composition procedure is described in the 4th aspect of this invention.

3rd Aspect: Efficient Temporally Scalable Motion Representation

An efficient temporally scalable motion representation should satisfy two requirements. Firstly, at most one motion mapping per video frame should be needed to reconstruct the video at any temporal resolution. This is consistent with the above observation that just one mapping per frame is sufficient to derive all mappings for the entire transform.

Secondly, the above property should apply at each temporal resolution available from the transform. In particular, this means that the motion information must be temporally embedded, with each successively higher temporal resolution requiring one extra motion mapping per pair of reconstructed video frames. This property allows the video content to be reconstructed at each available temporal resolution, without recourse to redundant motion information.

This aspect of the invention involves a temporally scalable motion information hierarchy, based on the method of motion field composition, as introduced in the description of the second aspect. This representation achieves both of the objectives mentioned above.

The motion information hierarchy described here is particularly important for motion adaptive lifting structures that are based on kernels longer than the simple Haar. Block transforms such as the Haar require only the motion information between every second pair of consecutive frames, at each stage of the decomposition. Therefore an efficient temporally scalable motion representation can be easily achieved by transmitting a single motion mapping for every reciprocal pair.

It is generally preferable to use longer wavelet kernels such as the 5/3. In fact, results given in A. Seeker and D. Taubman, "Lifting-based invertible motion adaptive transform (LIMAT) framework for highly scalable video compression", (accepted to appear in IEEE Trans. Image Proc., 2003) reveal that this can lead to considerable improvements in performance.

Figure 5:
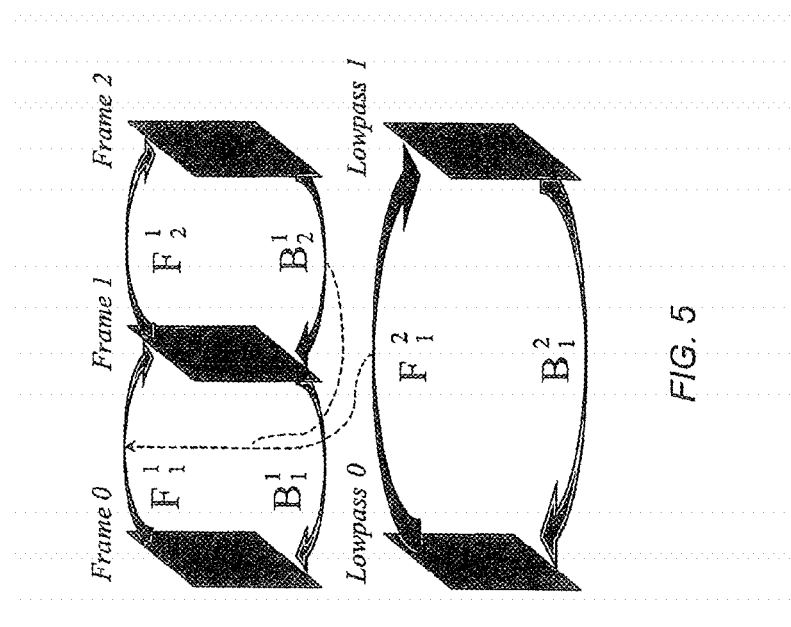
FIG. 5 illustrates schematically the compositing of motion fields in one embodiment of a temporally scalable motion representation for the motion adaptive 5/3 lifting transform.

The motion representation for two stages of the 5/3 transform is given in FIG. 5. The mappings required to perform the lifting steps are again shown as arrows, where the $i^{th}$ forward mapping in the $j^{th}$ transform level is denoted $F_i^j$. The term "forward mapping" is applied to those which approximate a current frame by warping a previous frame. Likewise, backward mappings, denoted $B_i^j$, correspond to warping a later frame to spatially align it with a current frame. Observe that the entire set of motion mappings depicted in FIG. 5 can be represented using only $F_{1^2}^2$ and $B_{2^1}$. Inverting $F_{1^2}$ produces the backward mapping $B_{1^2}$. The forward mapping $F_{1^1}$ is inferred by compositing the upper-level forward mapping $F^{1^2}$ with the lower-level backward mapping $B_2^1$. The remaining mappings $B_2^1$ and $F_2^1$ are recovered by inverting, $F_1^1$ and $B^{2^2}$, respectively.

For scenes with rapid motion, composited fields such as $F_1^1$ in FIG. 5, may suffer from an accumulation of the model failure regions present in the individual mappings. If so, the compressor may correct this by transmitting an optional refinement fields, possibly based on direct estimation using original data.

As mentioned, the case for the Haar wavelet is much simpler. Mappings $F_2^1$ Land $B_2^1$ are not required, so it is sufficient to code mappings $F_1^1$ and $F_1^2$, recovering the corresponding backward motion fields by inversion. The methods described above can be applied recursively to any number of transform stages, and the total number of required mappings is upper bounded by one per original frame. Temporal scalability is achieved since reversing a subset of the temporal decomposition stages requires no motion information from higher resolution levels.

Evidently, a motion mapping between any pair of frames can be obtained by a combination of composition and inversion operators involving the sequence of mappings $F_1^2$ and $B_{2i}^1$. It follows that this motion representation strategy is easily modified to encompass any wavelet kernel.

4th Aspect: Efficient Implementation of Motion Field Transformations

A 4th aspect of the present invention describes an efficient method for performing the motion field composition and inversion transformations mentioned in previous aspects.

One possible way to represent a composited mapping is in terms of a sequence of warpings through each individual mapping. Motion compensation could be performed by warping the actual data through each mapping in turn. However, this approach suffers from the accumulation of spatial aliasing and other distortions that typically accompany each warping, step.

A second problem with this approach is that errors due to boundary approximations also accumulate over the sequence of mappings. Boundary regions are prone to model failure, particularly when the scene undergoes global motion such as camera panning.

To avoid these problems, each location in the target frame of the composite motion field may be mapped back through the various individual mappings to find its location in the source frame of the composite motion field.

The preferred method, described here, however, is to construct a triangular mesh model for the composit motion field, deducing the displacements of the mesh node points by projecting them through the various component motion mappings. The triangular mesh model provides a continuous interpolation of the projected node positions and can be represented compactly in internal memory buffers. This method is particularly advantageous when used in conjunction with triangular mesh models for all of the individual motion mappings, since the frame warping machinery required to perform the motion adaptive temporal transformation involves only one type of operation—the affine transformation described previously.

Motion field inversion, may be performed using a similar strategy. The inverted motion mapping is represented using a forward triangular mesh motion model, whose node displacements are first found by tracing them through the inverse motion field. The accuracy associated with both composit and inverse motion-fields representations may be adjusted by modifying the size of the triangular mesh grid. In the preferred embodiment of the invention, the mesh node spacing used for representing composit and inverse motion fields is no larger 8 frame pixels and no smaller than 4 frame pixels.

5th Aspect: Successive Refinement of Motion and Sample Accuracy

In order to provide for scalable video bit-streams which span a wide range of bit-rates, from a few 10's of kilo-bits/s (kb/s) to 10's of mega-bits/s (Mb/s), the accuracy with which motion information is represented must also be scaled. Otherwise, the cost of coding motion information would consume an undue proportion (all or more) of the overall bit budget at low bit-rates and would be insufficient to provide significant coding gain at high bit-rates. In the 3rd aspect above, a method for providing temporally scalable motion information has been described. In this 5th aspect, a method is described for further scaling the cost of motion information, in a manner which is sensitive to both the accuracy and the spatial resolution required of the reconstructed video sequence.

During compression, an accurate motion representation is determined and used to adapt the various lifting steps in the motion adaptive transform. During decompression, however, it is not necessary to receive exactly the same motion parameters which were used during compression. The motion parameters are encoded using an embedded quantisation and coding strategy. Such strategies are now well known to those skilled in the art, being employed in scalable image and video codecs such as those described in J. Shapiro, "Embedded image coding using zerotrees of wavelet coefficients", IEEE Trans. Sig. Proc., vol 41, pp 3445-3462, December 1993., D. Taubman and A. Zakhor, "Multirate 3-d subband coding of video", IEEE Trans. Image Proc., vol. 3, pp. 572-588, September 1994, A. Said and W. Pearlman, "A new, fast and efficient image codec based on set partitioning in hierarchical trees", IEEE Trans. Circ. Syst. For Video tech., pp. 243-250, June 1996, D. Taubman, "High performance scalable image compression with EBCOT", IEEE Trans. Image Proc., vol. 9, pp. 1158-1170, July 2000. They allow the coded bit-stream to provide a successively more accurate representation of the information being coded. For the present purposes, this information consists of the motion parameters themselves, and each motion field, $W_{k1 \to k2}$, is provided with its own embedded bit-stream.

As an example of the way in which such an embedded motion representation may be used, consider an interactive client-server application, in which the client requests information for the video at some particular spatial resolution and temporal resolution (frame rate). Based on this information, the server determines the distortion which will be introduced by approximating the relevant motion information with only $L_q^{(M)}$ bits from the respective embedded bit-streams, where the available values for $L_q^{(M)}$ are determined by the particular embedded quantisation and coding strategy which has been used. Let $D_q^{(M)}$ denote this distortion, measured in, terms of Mean Squared Error (MSE), or a visually weighted MSE. The values $D_q^{(M)}$ may be estimated from the spatial-frequency power spectrum of the relevant, frames. Most notably, $D_q^{(M)}$ depends not only on the accuracy with which the motion parameters are represented by the $L_q^{(M)}$ bits of embedded motion information, but also on the spatial resolution of interest. At lower spatial resolutions, less accuracy is required for the motion information, since the magnitude of the phase shifts associated with motion error are directly proportional to spatial frequency.

Continuing the example, above, the server would also estimate or know the distortion, $D_p^{(s)}$, associated with the first $L_p^{(s)}$ bits of the embedded representation generated during scalable coding of the sample values produced by the motion adaptive transform. As already noted, scalable sample data compression schemes are well known to those skilled in the art Assuming an additive model for these two different distortion contributions, the server balances the amount of information delivered for the motion and sample data components, following the usual Lagrangian policy. Specifically, given a total budget of $L^{max}$ bits for both components, deduced from estimates of the network transport rate, or by any other means the server finds the largest values of $p_\lambda$ and $q_\lambda$ such that $$\frac{-\Delta D_{p\lambda}^{(S)}}{\Delta L_{p\lambda}^{(S)}} \geq \lambda \tag{5}$$

and $$\frac{-\Delta D_{q\lambda}^{(M)}}{\Delta L_{q\lambda}^{(M)}} \geq \lambda.$$

adjusting $\lambda>0$ so that $L_{p\lambda}^{(s)}+L_{q\lambda}^{(M)}$ is as large as possible, while not exceeding $L^{max}$. Here, $\Delta D_p^{(s)}/\Delta L_p^{(s)}$ and $\Delta D_q^{(M)}/\Delta L_q^{(M)}$ are discrete approximations to the distortion-length slope at the embedded truncation points p (for sample data) and q (for motion data) respectively.

The client-server application described above is only an example. Similar techniques may be used to construct scalable compressed video files which contain an embedded hierarchy of progressively higher quality video, each level in the hierarchy having its own balance between the amount of information contributed from the embedded motion representation and the embedded sample data representation.

The strategy described above, whereby an embedded motion representation is produced by embedded quantisation and coding of the individual motion parameters, may be extended to include progressive refinement according to the density of the motion parameters themselves. To see how this works, suppose that every second row and every second column were dropped from the rectangular grid of node positions in the triangular mesh of FIG. 3. In this coarse mesh, motion parameters would be sent only for the remaining node positions and the coarse triangular mesh model induced by this information would represent a coarse approximation to the original motion model. Such approximations are readily included within an embedded motion representation, from which an appropriate distribution between the motion and sample data coding costs may again be formed.

While rate-distortion optimisation strategies have previously been described in the literature for balancing the costs of motion and sample data information, this has not previously been done in a scalable setting, where both the motion and the sample data accuracy are progressively refined together.

While rate-distortion optimization strategies have previously been de scribed in the literature for balancing the costs of motion and sample data information, this has not previously been done in a scalable setting, where both the motion and the sample data accuracy are progressively refined together. There are, in our opinion, two principle reasons why progressively refined motion fields have not been investigated in the past for video compression. Firstly, most existing video compression systems (e.g., those described by international standards) employ motion compensated predictive coding, so if the decoder were to use different motion parameters to the encoder, their states would progressively drift apart. This problem does not exist in the context of motion adaptive wavelet transforms and, in particular, those based on the motion compensated lifting paradigm taught in W002/50772.

The second reason, why we believe others have not investigated progressively refillable motion for scalable video coding is that the motion information interacts in a complex manner with the video sample data, making it more difficult to deduce the impact of motion quantization on system performance. The invention disclosed here, however, is inspired by the following interesting observation. Although the interaction between motion errors and video sample data errors is generally complex, at all experimentally optimal combinations of the motion and sample data accuracy, this relationship simplifies and may be approximately modeled using linear methods. In the ensuing subsections, we teach some specific methods for scalable motion coding and for optimally balancing the distribution of motion information with video sample information.

Scalable Motion Coding Methods

As mentioned above, a variety of methods for embedded coding of data are well known to those skilled in the art. Amongst these various methods, the authors' experimental investigations have suggested particular preferred embodiments. Rather than coding the motion parameters directly, it is preferable to first subject the motion parameter fields to a spatial discrete wavelet transform (DWT). That is, the horizontal components of each motion vector are treated as a two dimensional image and the vertical components are similarly treated as a two dimensional image; each image is subjected to a spatial DWT and the transform coefficients are then coded in place of the original motion vectors.

The use of a spatial wavelet transform is found to offer two chief benefits over coding the motion parameters directly. Firstly, the transform typically produces a large number, of near-zero valued coefficients which can be quantized to zero with negligible error and then efficiently encoded. Secondly, the DWT shapes the quantization errors incurred when the motion representation is scaled, and this shaping is found to significantly reduce the reconstructed video distortion incurred at any given level of motion quantization error. In the preferred embodiment, a reversible (integer-to-integer) spatial DWT is used to allow exact recovery of the originally estimated motion parameters from the encoded transform coefficients, which is useful at high video bit-rates. Reversible wavelet transforms are well-known to those skilled in the art. One example is the reversible 5/3 spatial DWT which forms part of the JPEG2000 image compression standard, IS 15444-1.

Temporal transformation of the motion parameter information can have similar benefits to spatial transformation, and the effects are found to be somewhat complementary. That is, both the use of both a spatial DWT and a temporal transform together is recommended. In one particular embodiment, each pair of temporally adjacent motion fields is replaced by the sum and the difference of the corresponding motion vectors. These sums and differences may be interpreted as temporal low- and high-pass subbands.

Again, it is preferable to do this in a reversible manner which is compatible with efficient lossless coding, since at high video bit-rates it is best to preserve all of the estimated motion information. For this reason, the operations of sum and difference mentioned above should be replaced by the S-transform [V. I-leer and H. E. Reinfelder, "A comparison of reversible methods for data compression", Proc. SPIE conference, 'Medical Imaging IV', vol 1233, pp. 354-365, 1990].

As for the coding of motion transform coefficients, the preferred embodiments are those which use techniques derived from the general class of bit-plane coders. In particular, the highly efficient and finely embedded fractional bit-plane coding techniques which form part of the JPEG2000 image compression standard are to be recommended. In general, each subband produced by the motion parameter transform is partitioned into code-blocks, and each code-block is encoded using a fractional bit-plane coder, producing a separate finely embedded bit-stream for each motion subband code-block.

In many cases, there are insufficient motion parameters to justify dividing motion subbands into multiple code-blocks, but the code-block partitioning principles enshrined in the JPEG2000 standard can be useful when compressing very large video frames, each of which has a large number of motion vectors. It general, then, the motion information is represented by a collection of code-blocks; each of which has a finely embedded bit-stream which may be truncated to any of a variety of coded lengths.

A Layered Framework for Joint Scaling, of Motion and Video Sample Data

The EBCOT algorithm [D. Taubman, "High performance scalable image compression with EBCOT", IEEE Trans. Image Proc., vol. 9, pp. 1158-1170, July 2000] represents an excellent framework for converting a large number of embedded code-block bit-streams, each with its own set of truncation points, into a global collection of abstract "quality" layers. Each quality layer contains incremental contributions from each code-blocks embedded bit-stream, where these contributions are balanced in a manner which minimises the distortion associated with the overall representation at the total bit-rates associated with the quality layer. By arranging the quality layers in sequence, one obtains a succession of truncation points, at each of which the representation is as accurate as it can be, relative to the size of the included quality layers.

Although the interaction between motion errors and video sample errors is non-trivial, it turns out that for combinations of motion and video sample bit-rates which are optimal, the relationship between motion error and reconstructed video quality is approximately linear. We may represent this linear relationship as $$D_{x,M} = \Psi_{R,S} D_M$$

where $D_M$ denotes mean squared error in the motion vectors due to truncation of the embedded motion parameter code-block bit-streams, and $D_{x,M}$ represents the total induced squared error in the reconstructed video sequence. The scaling factor, $\Psi_{R,S}$, depends upon the spatial resolution at which the video signal is to be reconstructed and also upon the accuracy with which the video samples are represented. In preferred embodiments of the present invention, motion parameter quality layers are constructed from the embedded motion block bit-streams, following the EBCOT paradigm.

In view of the above relationship, and noting that the scaling factor, $\Psi_{R,S}$, is substantially similar for all motion coefficient subbands and code-blocks, the rate-distortion optimality of the layered motion representation holds over a wide range of spatial resolutions and levels of video sample quantization error. This is extremely convenient, since it means that the rate-distortion optimization problem expressed in equation (5) can be solved once, while constructing the motion quality layers, after which a video server or transcoder need only decide how many motion layers are to be included in the video bit-stream for a given spatial resolution and a given level of error in the video sample data.

In preferred embodiments of the invention, the same layering strategy of EBCOT is used to construct a separate set of rate-distortion optimal quality layers for the video sample data. These are obtained by subjecting the temporal subbands produced by the motion-compensated temporal lifting steps to spatial wavelet transform, partitioning the spatio-temporal video subbands into their own code-blocks, and generating, embedded bit-streams for each video sample code-block. The video sample quality layers then consist of incremental contributions from the various video sample code-blocks, such at the video sample distortion is as small as it can be, relative to the total size of those quality layers. It turns out, most conveniently, that the generation of rate-distortion optimal video sample quality layers is substantially independent of the spatial resolution (number of resolution levels from the spatial video sample DWT which will be sent to the decoder) and the temporal resolution (number of temporal subbands produced by the motion compensated lifting steps which will be sent to the decoder). It also turns out that the optimality of the layer boundaries is approximately independent of the level of motion distortion, at least for combinations of motion and video sample bit-rates which are approximately optimal.

In summary, preferred embodiments of the invention produce a single set of motion quality layers and a single set of video sample quality layers. The layers are internally rate-distortion optimal over the temporal interval within which they are formed. Since video streams can have unbounded duration, we divide the time scale into epochs known as "frame slots" In each frame slot, a separate set of motion quality layers and video sample quality layers is formed. The optimization problem associated with equation (5) then reduces to that of balancing the number of motion quality layers with the number of video sample quality layers which are sent to a decoder within each frame slot. The solution to this problem is dealt with below, but we note that it depends on the parameter $\Psi_{R,S}$ which is a function of both the spatial, resolution of interest to the decoder and the accuracy of the video sample data. Equivalently, for any particular number of video sample layers, p, the number of motion layers, q, which balances the rate-distortion slopes of the motion and video sample information is a function of both p and the spatial resolution of interest.

Methods for Optimizing the Distribution of Motion and Video Sample Data

In view of the preceding discussion, a complete implementation of the preferred embodiment of the invention must provide a means for deciding how many motion quality layers, q, are to be included with a subset of the video bit-stream which includes p video sample quality layers, given the spatial resolution R, at which the video content is to be viewed. The preferred way to do this is to include a collection of tables with each frame slot, there being one table per spatial resolution which may be of interest, where each table provides an entry for each number of video sample quality layers, p, identifying the corresponding best number of motion layers, $q_p$. Depending upon the application, there may be no need to send the table itself to a decoder.

A video server or transcoder, needing to meet a compressed length constraint $L_{max}$ Within each frame slot, can use these tables to determine p and $q_p$ which are jointly optimal, such that the total length of the respective quality layers is as small as possible, but no smaller than $L_{max}$. It is then preferable to discard data from the $p^{th}$ video sample quality layer, until the length target $L_{max}$ is satisfied. This approach is preferable to that of discarding motion data, since there is generally more video sample data. One way to build the aforementioned tables is to simply decompress the video at each spatial resolution, using each combination of motion and sample quality layers, q and p, so as to find the value of $p_q$ which maximizes the ratio of distortion to total bit-rate in each frame slot, for each p. Of course, this can be computationally expensive. Nevertheless, this brute-force search strategy is computationally feasible.

A preferred means to build the aforementioned tables is to use the fact that these tables depend only on the linear scaling factors, $\Psi_{R,S}$. These scaling factors depend, in turn, on the power spectra of the video frames which are reconstructed at each level of video sample error, i.e., at each video sample quality layer p. In the preferred embodiment of the invention, these power spectra are estimated directly from the video sample subband data during the compression process. We find, in practice, that such estimation strategies can produce results almost as good as the brute force search method described above, at a fraction of the computational cost.

What is claimed is:

1. A method for incrementally coding and signaling motion information for a video compression system involving a motion adaptive transform and embedded coding of transformed video samples using a computer, said method comprising the steps of:
   (a) storing computer-readable instructions in the computer which, when executed, produce an embedded motion field bit-stream, representing an embedded quantization of the motion field parameter values, such that each motion field is progressively refined from a coarsely quantized version to a high quality version as the embedded representation continues;
   (b) storing computer-readable instructions in the computer which, when executed, interleave successive contributions from said embedded motion field bit-stream with successive contributions from said embedded coding of the transformed video samples, where said transformed video samples are formed using the high quality version of the motion field; and
   (c) the embedded motion field bit-stream being such as to allow a quantitative version of the motion field to be extracted by a decoder and used to reconstruct the video based on a motion adaptive transform, using decoded transformed video samples that were originally generated using the high-quality version of the motion field.

2. The system of claim 1, where the embedded motion field bit-stream is obtained by coding node displacement parameters associated with a triangular mesh motion model on a coarse to fine grid, each successive segment of the embedded bit-stream providing displacement parameters for node positions which lie on a finer grid than the previous stage, all coarser grids of node positions being subsets of all finer grids of node points.

3. The system of claim 2, where a coarse to fine motion representation is obtained by first transforming the motion parameters and then coding the transform coefficients using embedded quantization and coding techniques.

4. The system of claim 3, where the motion parameters are transformed by applying at least one of either spatial discrete wavelet transforms or temporal transforms thereto.

5. The system of claim 4, wherein at least one of either the spatial or temporal transforms are reversible integer-to-integer transforms, suitable for lossless compression.

6. The system of claim 1, wherein the embedded motion bit-streams are arranged into a sequence of quality layers, and the transformed video samples are also encoded into embedded bit-streams which are arranged into a separate sequence of quality layers.

7. The system of claim 1, where said interleaving of the contributions from the embedded motion bit-streams and from the transformed video samples is performed in a manner which minimizes expected distortion in reconstructed video sequence at each of a plurality of compressed video bit-rates.

8. The system of claim 7, where the measure of distortion is Mean Squared Error.

9. The system of claim 7, where the measure of distortion is a weighted sum of the Mean Squared Error contributions from different spatial frequency bands, weighted according to perceptual relevance factors.

10. The system of claim 7, where the distortion associated with inaccurate representation of the motion parameters is determined using an estimate of a spatial power spectrum of the video source.

11. The system of claim 10, where the spatial power spectrum of the video source is estimated using spatio-temporal video sample subbands created during compression.

12. The system of claim 7, where the distortion associated with inaccurate representation of the motion parameters is determined using information about a spatial resolution at which the video bit-stream is to be decompressed.

13. The system of claim 1, wherein proportions of contributions from said embedded motion fields and said transformed video samples in the embedded bit-stream are determined on the basis of a plurality of tables associated with each frame, each table being associated with a spatial resolution at which the video bit-stream is to be decompressed.

14. The method of claim 1, where the embedded motion field bit-stream is obtained by coding node displacement parameters associated with a triangular mesh motion model on a coarse to fine grid, each successive segment of the embedded bit-stream providing displacement parameters for node positions which lie on a finer grid than the previous stage, all coarser grids of node positions being subsets of all finer grids of node points.

15. The method of claim 14, where a coarse to fine motion representation is obtained by first transforming the motion parameters and then coding the transform coefficients using embedded quantization and coding techniques.

16. The method of claim 15, where the motion parameters are transformed by applying at least one of either spatial discrete wavelet transforms or temporal transforms thereto.

17. The method of claim 16, wherein at least one of either the spatial or temporal transforms are reversible integer-to-integer transforms, suitable for lossless compression.

18. The method of claim 1, wherein the embedded motion bit-streams are arranged into a sequence of quality layers, and the transformed video samples are also encoded into embedded bit-streams which are arranged into a separate sequence of quality layers.

19. The method of claim 1, where said interleaving of the contributions from the embedded motion bit-streams and from the transformed video samples is performed in a manner which minimizes expected distortion in reconstructed video sequence at each of a plurality of compressed video bit-rates.

20. The method of claim 19, where the measure of distortion is Mean Squared Error.

21. The method of claim 19, where the measure of distortion is a weighted sum of the Mean Squared Error contributions from different spatial frequency bands, weighted according to perceptual relevance factors.

22. The method of claim 19, where the distortion associated with inaccurate representation of the motion parameters is determined using an estimate of a spatial power spectrum of the video source.

23. The method of claim 22, where the spatial power spectrum of the video source is estimated using spatio-temporal video sample subbands created during compression.

24. The method of claim 19, where the distortion associated with inaccurate representation of the motion parameters is determined using information about a spatial resolution at which the video bit-stream is to be decompressed.

25. The method of claim 1, wherein proportions of contributions from said embedded motion fields and said transformed video samples in the embedded bit-stream are determined on the basis of a plurality of tables associated with each frame, each table being associated with a spatial resolution at which the video bit-stream is to be decompressed.

26. A system for incrementally coding and signaling motion information for a video compression system involving a motion adaptive transform and embedded coding of transformed video samples, said system comprising:
  a processor and a memory, wherein the memory comprises instructions executable by the processor to:
  (a) producing an embedded motion field bit-stream, representing an embedded quantization of the motion field parameter values, such that each motion field is progressively refined from a coarsely quantized version to a high quality version as the embedded representation continues;
  (b) interleave successive contributions from said embedded motion fields field bit-stream with successive contributions from said embedded coding of the transformed video samples, where said transformed video samples are formed using the high quality version of the motion field; and
  (c) the embedded motion field bit-stream being such as to enable a version of motion field to be extracted by decoder and used to reconstruct the video based on a motion adaptive transform, using decoded transform video samples that were originally generated using the high quality version of the motion field.

27. A system for incrementally coding and signaling motion information for a video compression system involving a motion adaptive transform and embedded coding of transformed video samples, said system comprising:
  a processor and a memory, wherein the memory comprises instructions executable by the processor to produce an embedded motion field bit-stream, representing each motion field in coarse to fine fashion and instructions for interleaving successive contributions from said embedded motion fields field bit stream with successive contributions from said embedded coding of the transformed video samples, wherein proportions of contributions from said embedded motion fields and said transformed video samples in the embedded bit-stream are determined on the basis of a plurality of tables associated with each frame, each table being associated with a spatial resolution at which the video bit-stream is to be decompressed, and wherein the embedded motion bit-streams and the transformed video samples are each encoded as a series of quality layers and the tables identify a number of motion quality layers are to be included with each number of video sample quality layers.

28. A non-transitory computer-readable storage medium with an executable program stored thereon, wherein the program instructs the computer to implement the method of claim 1.

* * * * *